Dec. 2, 1941.  H. J. SIEKMANN  2,264,458
VERTICAL CRANK PIN LATHE
Filed Aug. 20, 1940  4 Sheets-Sheet 1
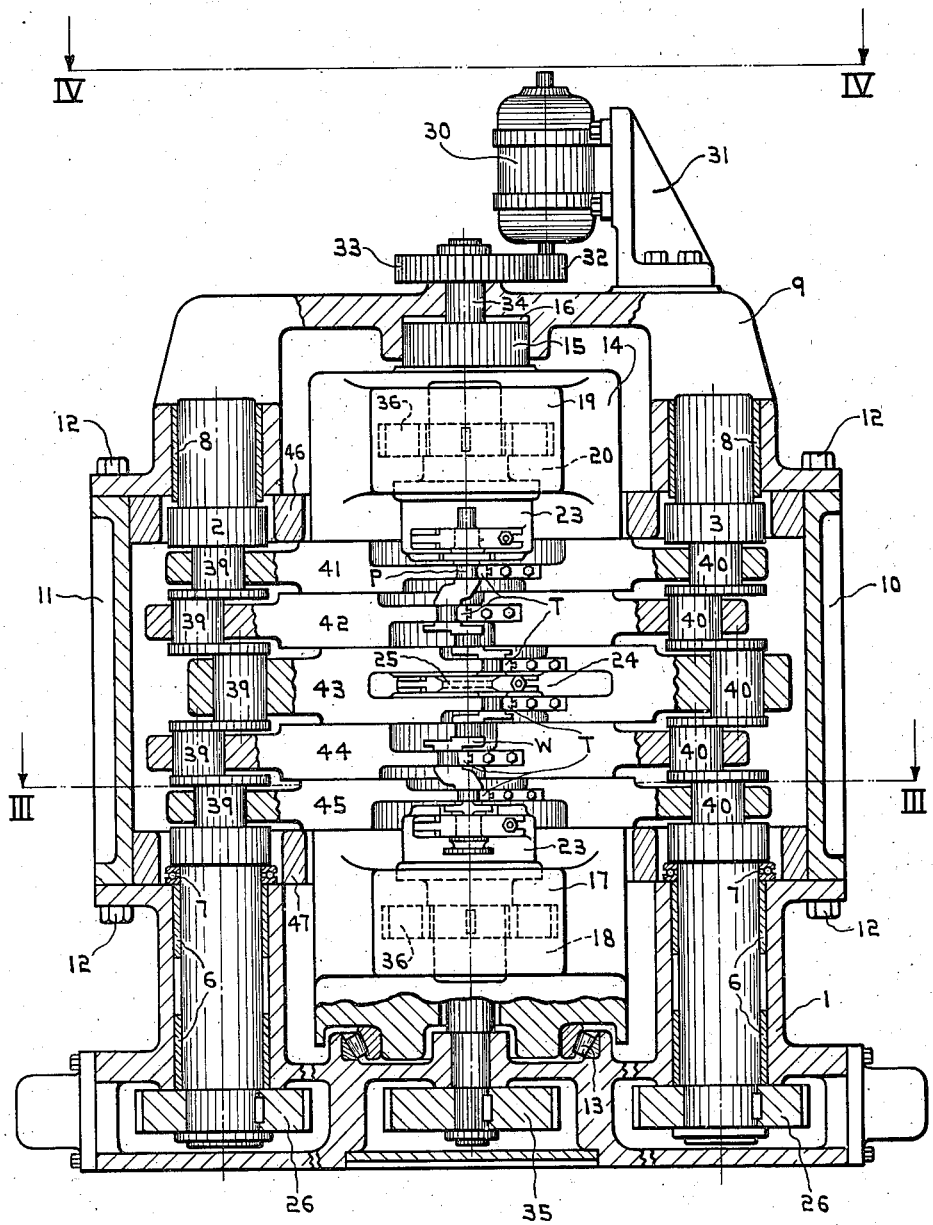
FIG_I
INVENTOR.
HAROLD J. SIEKMANN
BY Willard S. Groom

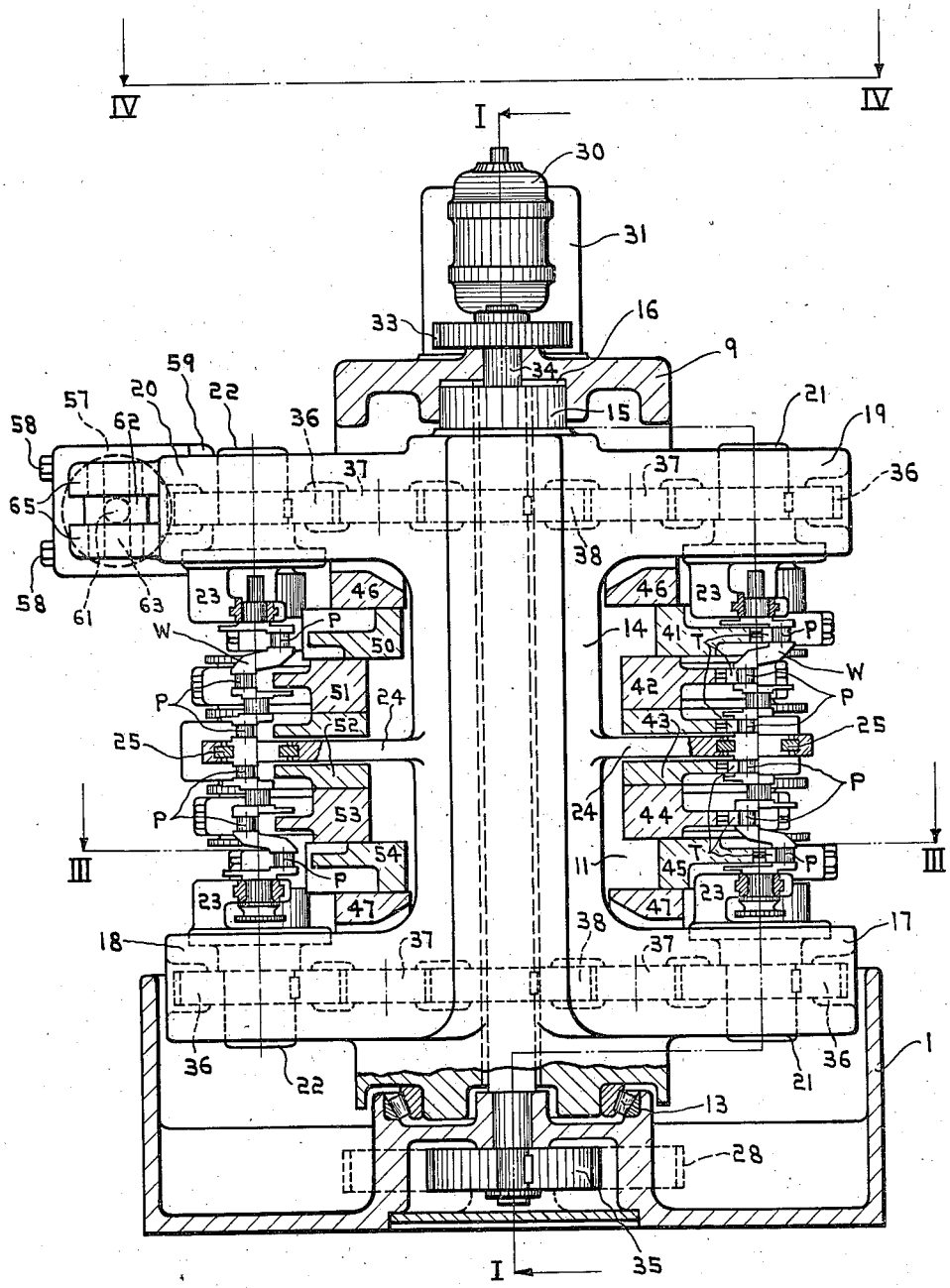
FIG. II

Dec. 2, 1941.    H. J. SIEKMANN    2,264,458
VERTICAL CRANK PIN LATHE
Filed Aug. 20, 1940    4 Sheets-Sheet 3
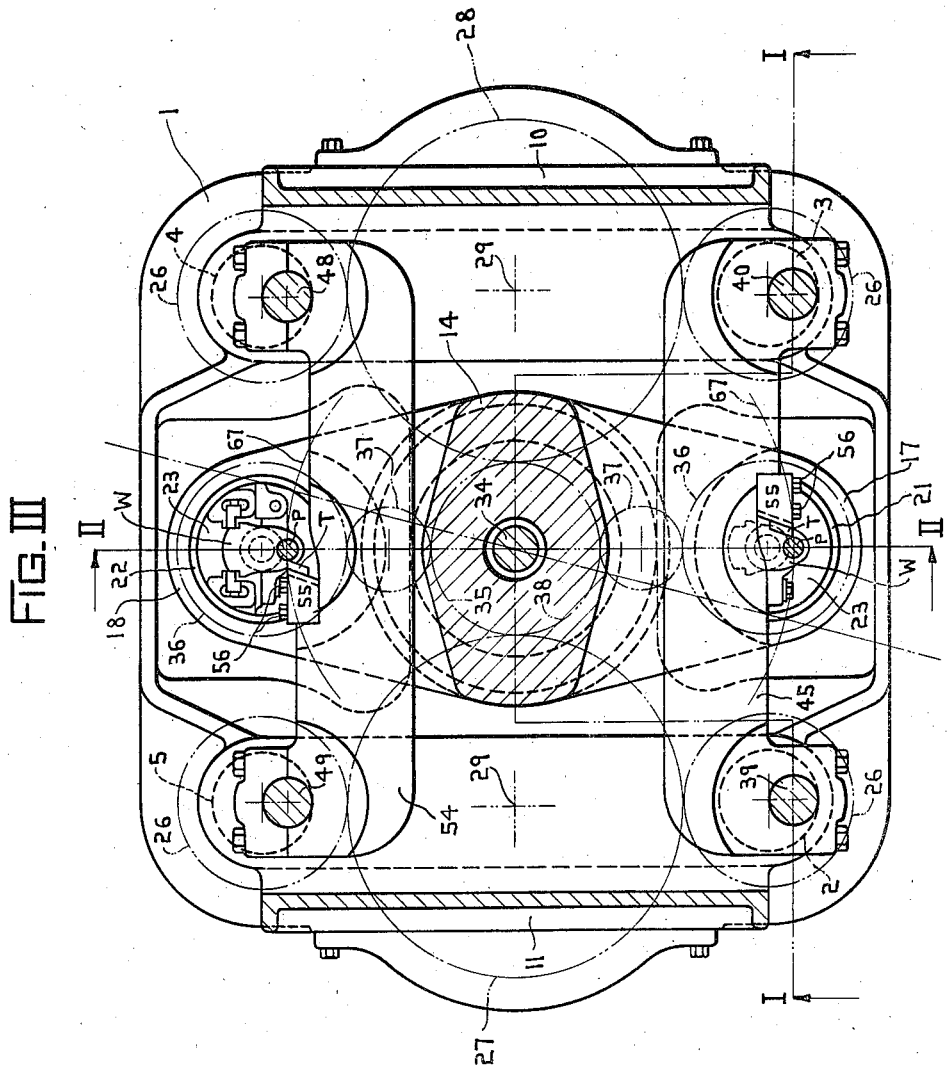
INVENTOR.
HAROLD J. SIEKMANN
BY Willard L. Groves

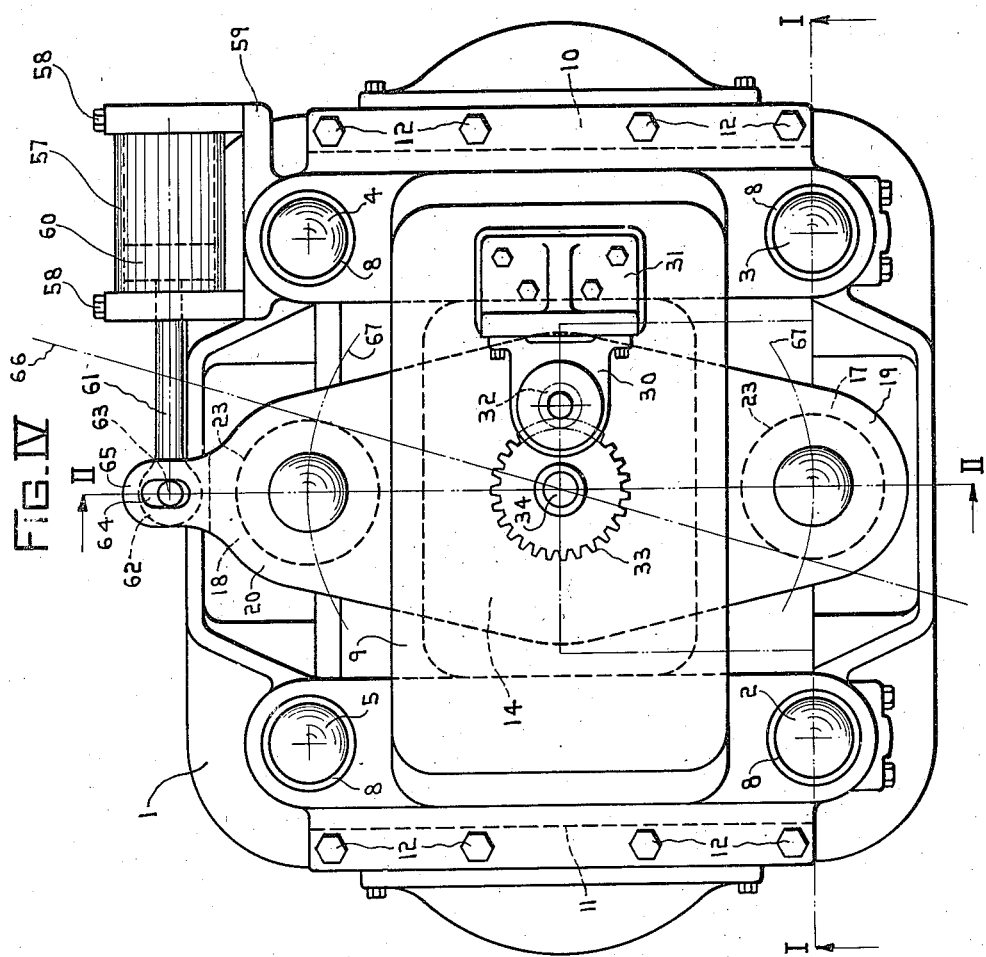

Patented Dec. 2, 1941

2,264,458

UNITED STATES PATENT OFFICE 2,264,458

VERTICAL CRANK PIN LATHE

Harold J. Sickmann, Cincinnati, Ohio, assignor to The R. K. Le Blond Machine Tool Company, Cincinnati, Ohio, a corporation of Delaware Application August 20, 1940, Serial No. 353,407

7 Claims. (Cl. 82—9)

This invention relates to machines for turning the crank pins of multi-throw internal combustion engine crankshafts and is particularly related to multiple spindle vertical lathes capable of doing this work. Heretofore, in multiple spindle crank pin lathes adapted to the simultaneous machining of all of the pin bearings on a plurality of crankshafts at one time, inherent defects were present in that the turning of the crank pins of one of the crankshafts at one work spindle affected the accuracy of the turning being performed on the crankshaft at other work spindles. Also it was found that the arrangement of such prior multiple spindle pin turning lathes were such that the material and chips cut from the work on one of the work spindles were precipitated down on the other work spindle and its cutting tools resulting in damage to the machined work surfaces of the spindle and also resulting in inaccurate machining and damage to the cutting tools and mechanism of the lathe during such cutting operations. There was also the problem of loading the work spindles in such prior multiple spindle pin turning machines in that it was necessary to load each spindle separately and it was impossible to simultaneously load or unload both spindles at one time thus saving the loading time and the costly high productive production time of such multiple spindle crank pin machines.

It is therefore the object of this invention to provide a unique arrangement of a vertical multiple spindle crank pin lathe, which is capable of machining a plurality of crankshafts at one time, in which the cutting tools operating on the crank pins of one of the work crankshafts are controlled in true orbital motion independent of the cutting tools operating on the other crankshafts, so as to effect a highly accurate finished result for each of the crankshafts being turned.

Another object of this invention is to so arrange the spindles that the material and chips cut from the work do not in any way interfere with the work being carried on at another work spindle and each spindle in itself being an independent functioning mechanism devoid of interfering with any of the other work spindles, particularly in so far as the material cut from the work is concerned and the transfer of vibration and chatter from one work spindle to another.

And still another object of this invention is to provide a multiple spindle vertical crank pin turning lathe in which each of the work spindles is accessible to an operator so that work may be put in and be taken out of these work spindles at the same instant thereby greatly reducing the non-productive or loading time of the high productive type of machine here involved.

In order to carry out these important improvements and advances in multiple spindle pin turning lathes, a vertical spindle carrying and feeding cradle is provided centrally of the machine, which has suitable chucking mechanism representing a series of work spindles each accessible to a workman independent of interference with any other workman at another work station. It is then the object to provide orbital actuating mechanism, such as a pair of master crankshafts, for actuating the orbitally moving tools for each of the work spindles so that the cutting action at each work spindle has no effect whatever on the orbital actuating mechanism for the tool slides for any other work spindle.

It is also the idea to arrange the lathe so that the work spindles may be swung to and from the cutting tools to affect the feeding action of the work relative to the tool by a simplified centralized feeding arrangement whereby maximum rigidity and maximum simplicity of construction is provided to affect the feeding of the multiple spindles to the various orbitally moving tool feeding devices.

Further features and advantages of this invention will appear from a detailed description of the drawings in which:

Figure I is a front elevation of a multiple spindle vertical crank pin lathe incorporating my invention shown partly in section on the line I—I of Figures III and IV.

Figure II is a side elevation of the machine of Figure I shown partly in section on the line II—II of Figures III and IV.

Figure III is a horizontal section through the machine on the line III—III of Figures I and II particularly showing the arrangement and mounting of the orbitally moving tool carrier unit in relation to the work spindle feeding cradle and showing the synchronizing gearing interconnecting the master crankshafts and work spindles for maintaining their synchronous rotation at all times during the feeding motion of the work spindle cradle.

Figure IV is a plan view of the machine indicated by the line IV—IV in Figures I and II, particularly showing the work spindle and master crank driving mechanism and the feeding cylinder for effecting the swinging feeding motion in the work spindle cradle.

The machine comprises a base 1 in which are journaled the master crankshafts 2, 3, 4, and 5 in appropriate bearings 6 and 7 best shown in Figure I. The upper ends of these master crankshafts are supported in suitable bearings 8 in the housing 9 which is carried and connected to upright supports 10 and 11 by suitable bolting means 12. Journaled on a suitable thrust bearing 13 located centrally of the base 1, is the work spindle feeding cradle 14 which is also supported at its upper end by the integral trunnion 15 which is journaled in the bearing bore 16 in the housing 9. This work spindle feeding cradle 14 is substantially of H-shaped construction, turned on its side, as seen best in Figure II, and has lower projecting work spindle supporting arms 17 and 18 and upper work spindle supporting arms 19 and 20 in which are appropriately journaled the work spindles 21 and 22. These work spindles 21 and 22 each carry appropriate pot chucks 23 which are adapted to support and rotate, in proper indexed relationship, the work pieces or, in this instance, the crankshafts W.

Also formed integrally with this work spindle feeding cradle 14, are the steady rest supporting members 24, which have the conventional steady rest bearing means 25 for supporting the crankshaft W intermediate its end in order to steady it properly during the cutting operation to be performed on the crank pins of the crankshaft.

Referring particularly to Figure III, the master crankshafts and work spindles are rotated in synchronism by means of the gearing consisting of a series of gears 26 of equal size and number of teeth mounted on the lower ends of the master crankshafts in the base 1 of the machine. The gears 26 of the master crankshafts 2 and 5 are interconnected for synchronous rotation by means of the idler gear 27 while the gears 26 on the master crankshafts 3 and 4 are connected in synchronous rotation by means of the idler gear 28, both of which idler gears are appropriately mounted on suitable axes 29 in the base 1 of the machine. Driving power is applied to these idler gears 27 and 28 from the main drive motor 30 mounted on a suitable bracket 31 on top of the housing 9 of the machine. This motor 30 has a driving pinion 32 which drives a gear 33 fixed on the vertical centrally located drive shaft 34 which extends from the top of the machine down into the base, as best shown in Figure II, where it has fixed on it, a gear 35. This gear 35 is arranged, as can best be seen in Figure III, to simultaneously engage both of the idler gears 27 and 28, so that as power is applied to the driving motor 30, all of the master crankshafts will be rotated in exact synchronism.

The work spindles are likewise rotated in synchronous motion with these master crankshafts by suitable gearing actuated from the drive shaft 34, as best shown in Figure II. On the work spindles 21 and 22 are fixed appropriate gears 36, which are of the same size and number of teeth as the gears 26 on the master crankshafts 2, 3, 4, and 5, and these gears are driven through idler gears 37 by the gears 38 fixed on the vertical drive shaft 34, these gears 38 being of the same size and number of teeth as the gear 35 on the lower end of this vertical drive shaft 34. It can therefore be seen that in applying power to the shaft 34 from the motor 30, all of the master crankshafts 2, 3, 4, and 5 and the work spindles 21 and 22 will be rotated in exact timed synchronous rotation.

Mounted on the crank pins 39 and 40 of the master crankshafts 2 and 3 are the orbitally moving tool carrier units 41, 42, 43, 44, and 45, which are appropriately confined against movement axially of the work spindles 21 by suitable thrust plate means 46 and 47 in a manner fully disclosed in Patent Reissue 18,662. Similarly, on the crank pins 48 and 49 of the master crankshafts 4 and 5 respectively, are mounted the tool carrier units 50, 51, 52, 53, and 54, likewise confined against axial displacement of the work spindles 22 by these thrust plates 46 and 47. On each of these tool carrier units are mounted appropriate cutting tools T on suitable tool holders 55, which are bolted through the tool carrier unit by suitable means 56, each of the cutting tools T operating on a crank pin P of the work crankshaft W to be machined.

The relative feeding of the crankshaft W and the tools T is affected by swinging the H shaped work spindle feeding cradle 14 on the bearing 13 and trunnion 15 by means of a suitable hydraulic feed cylinder 57, best shown in Figure IV, which is securely mounted by suitable screws 58 to an integral bracket portion 59 of the housing 9. This feed cylinder 57 has a usual piston 60 and connecting rod 61, having an enlarged end portion 62 carrying a pin 63 which operates in a slot 64 formed in projecting lugs 65 formed integral with projecting arm 20 of the work spindle feeding cradle 14, so that as fluid pressure is applied to the cylinder 57, the cradle may be rocked from the tool fed-in position shown by the line II—II in Figures III and IV to the withdrawn position of the work from the tools as indicated by the line 66 in these Figures III and IV, the relative feeding of the cutting tools T taking place along the line 67 indicated in these figures.

Having thus fully set forth and described my invention what I claim as new and desire to secure by United States Letters Patent is:

1. In a crank pin lathe, a frame, a series of four master crankshafts vertically journaled in said frame and located at the four corners of a rectangle, an H shaped work spindle feeding cradle pivotally mounted centrally of said master crankshafts, a pair of work spindles on said cradle, orbitally moving tool carrier units mounted on said crankshafts, cutting tools on said tool carriers, and means for moving said cradle to affect relative feeding movement of said work spindles and said cutting tools.

2. In a crank pin lathe, a frame, a series of four vertically journaled master cranks in said frame located at the four corners of a rectangle, a swinging work carrying cradle pivotally mounted centrally of said rectangle, work spindles journaled on said cradle with their axes of rotation lying substantially in planes formed by the sides of said rectangle, means for rotating said master crankshafts and work spindles in synchronism, orbitally moving tool carriers mounted on said master crankshafts having cutting tools arranged to machine a work piece in said work spindles, and means for swinging said cradle to affect relative feeding of said work spindles and said cutting tools.

3. In a vertical crank pin turning lathe, a frame, a series of master crankshafts vertically journaled in said frame and located one at each corner of a rectangular arrangement in said frame, an H shaped work carrier pivotally mounted on its side on said frame, work spindles journaled in the projecting arms of said work carrier, a series of orbitally moving tool carriers journaled on said master crankshafts, cutting tools on said orbitally moving tool carriers, said orbitally moving tool carriers being mounted on a pair of crankshafts for each work spindle to which its cutting tools are associated, and means for moving said carrier so as to affect relative feeding of said work spindles and said cutting tools.

4. In a crankshaft lathe, a frame, a series of four master crankshafts vertically journaled in said frame and located at the four corners of a rectangular arrangement of said crankshafts in said frame, a swinging work feeding cradle pivotally mounted about an axis centrally located with respect to the said rectangular arrangement, projecting arms on said carrier member located between said master crankshafts, work spindles journaled on said projections of said carrier, orbitally moving tool carriers journaled on pairs of said master crankshafts, cutting tools mounted on said orbitally moving tool carriers, and means for swinging said cradle so as to move said work spindles in a plane defined by the axes of rotation of said master crankshafts so as to affect relative feeding of said work spindles and the cutting tools of the respective orbitally moving tool carriers associated with said work spindles.

5. In a vertical multiple spindle crank pin lathe, a frame, four master crankshafts vertically journaled in said frame and arranged at the four corners of a rectangular arrangement in said frame, a work spindle carrying and feeding member movably mounted on said frame, a pair of work spindles mounted on said carrier, one located in a plane passing through the axes of two of said master crankshafts, the other of said work spindles having its axes lying in a plane passing through the other two of said master crankshafts, a series of orbitally moving tool carrier units for each work spindle, each respective group of orbitally moving tool carriers being mounted on the crank pins of the master crankshafts between which said respective work spindle is located, cutting tools mounted on said tool carriers, and means for moving said work spindles with their axes in the plane defined by the axes of the pair of master crankshafts between which said work spindles are located, and means for rotating said master crankshafts and work spindles in synchronism.

6. In a vertical crank pin lathe, a frame, a series of four master crankshafts vertically journaled in said frame and arranged at the four corners of a rectangular arrangement in said frame, a work spindle carrying member pivotally mounted about an axis centrally located in said rectangular arrangement, a series of work spindles journaled on said carrier member, orbitally moving tool carriers mounted on pairs of said master crankshafts and associated with each of said work spindles, and means for rotating said master crankshafts and work spindles in synchronism comprising a vertical drive shaft journaled centrally of said rectangular arrangement and means connecting said drive shaft to said master crankshafts and work spindles for synchronous driving relationship, and means mounted on the frame of said machine for driving said shaft.

7. In a vertical crank pin turning lathe, a frame, a series of four master crankshafts vertically journaled in said frame in a rectangular arrangement with each crankshaft being located at a corner of said rectangle, an idler gear interconnecting two of said master crankshafts, and a second idler gear interconnecting the other two of said master crankshafts, a work spindle carrying member pivotally mounted centrally of said rectangular arrangement of said crankshafts, a series of work spindles, journaled on said carrier and located between said master crankshafts, a series of orbitally moving tool carrying members mounted on pairs of said master crankshafts and associated with said work spindles, the pairs of master crankshafts for each group of orbitally moving tool carrier units each being driven by one of said idler gears in connecting pairs of said master crankshafts, a central drive shaft located coaxially with the axis of pivoting of said work spindle carrying member, a gear on said drive shaft adapted to simultaneously drive said idler gears connected to said master crankshafts, and idler gears carried by said work spindle carrier member driven by other gears on said vertical drive shaft in turn connected to gearing on the work spindles of said lathe whereby rotation of said vertical drive shafts effects synchronous rotation of said master crankshafts and said work spindles, and means for swinging said work carrier to affect relative movement of said work spindles and said orbitally moving tool carriers.

HAROLD J. SIEKMANN.